United States Patent [19]

Fujioka

[11] Patent Number: 4,465,167
[45] Date of Patent: Aug. 14, 1984

[54] AUTOMATIC TRANSMISSION SELECTOR VALVE

[75] Inventor: Kazuyoshi Fujioka, Tokyo, Japan

[73] Assignee: Nissan Motor Company, Limited, Yokohama, Japan

[21] Appl. No.: 322,252

[22] Filed: Nov. 17, 1981

Related U.S. Application Data

[63] Continuation of Ser. No. 146,936, May 5, 1980, abandoned.

[30] Foreign Application Priority Data

May 16, 1979 [JP] Japan .................... 54-65965

[51] Int. Cl.³ ............................................. B60K 41/22
[52] U.S. Cl. ............................. 192/3.57; 74/473 SW; 137/625.23
[58] Field of Search .................. 192/3.57, 87.19, 87.18, 192/87.14, 51, 109 F, 4 C; 74/473 SW, 475; 137/625.22, 625.23

[56] References Cited

U.S. PATENT DOCUMENTS

| | | | |
|---|---|---|---|
| 2,979,963 | 4/1961 | Snoy | 192/87.19 X |
| 3,042,165 | 7/1962 | Yokel | 192/3.57 X |
| 3,458,018 | 7/1969 | Shore | 192/4 C |
| 3,540,559 | 11/1970 | Shore | |
| 3,606,906 | 9/1971 | Shore | 192/4 C |
| 3,628,570 | 12/1971 | Andis | 137/625.23 |
| 3,752,281 | 8/1973 | Arnold | 192/87.19 |
| 3,938,637 | 2/1976 | Murakami | 192/87.19 |
| 4,096,882 | 6/1978 | Yano et al. | 192/109 F |

FOREIGN PATENT DOCUMENTS

| | | |
|---|---|---|
| 1600995 | 4/1972 | Fed. Rep. of Germany . |
| 2347043 | 4/1975 | Fed. Rep. of Germany . |

Primary Examiner—George H. Krizmanich
Attorney, Agent, or Firm—Thompson, Birch, Gauthier & Samuels

[57] ABSTRACT

A clutch position selector valve for use with a transmission for an industrial vehicle. The selector valve selectively establishes communication between a fluid pressure source and a forward clutch chamber or a reverse clutch chamber. The selector valve comprises a valve body having an inlet port communicating with the pressure fluid source, a forward clutch port communicating with the forward clutch chamber, a reverse clutch port communicating with the reverse clutch port and a drain port communicating with a fluid reservoir, and a valve element selectively establishing communication between the inlet port and the forward or reverse clutch ports. The valve element is removably and reversibly disposed within the interior of the valve body and cooperates with a selector lever to shift the element between the forward and reverse positions. This reversible feature permits the operating lever to be located on either side of a steering column for convenience of operation.

15 Claims, 10 Drawing Figures

AUTOMATIC TRANSMISSION SELECTOR VALVE

This is a continuation of application Ser. No. 146,936, filed May 5, 1980, now abandoned.

BACKGROUND OF THE INVENTION

The present invention relates generally to a transmission for an automotive vehicle, particularly for use with working or industrial vehicles such as fork lift trucks, shovel loaders and the like. More specifically, the present invention relates to a clutch position selector valve means of an automatic power transmission for the industrial vehicle for switching the clutch position between the forward clutch position and the reverse clutch position for driving the vehicle in the forward and reverse direction.

Generally, this type of transmission has an operating lever for switching clutch position between the forward and reverse clutch positions. The operating lever is generally mounted on a steering column having at the top a steering wheel and is generally positioned at the left side of the steering column adjacent the steering wheel, whereby, a human operator can operate the steering wheel by his right hand and operate the operating lever and a control lever for controlling the working equipment mounted on the vehicle such as, for example, a lifter of the fork lift truck or power shovel of the shovel loader, by his left hand. The operating lever is connected to a hydraulic selector valve through a linkage of control shafts, levers and rods. The operating lever selectively connects an inlet port of the valve means with a hydraulic circuit for switching clutch positions of the transmission. On such a transmission, it has been sometimes required to reversibly position the operating lever at right side of the steering column so as to enable the operator to operate the steering wheel by his left hand and operate the operating lever and the control lever by his right hand. In such case, it is necessary to adapt the hydraulic circuit to cause the control shaft to rotate in the opposite direction. However, it is complicated and troublesome to change the arrangement of the hydraulic circuit. Therefore, the conventional transmission for the working vehicle is provided with a plurality of bell-cranks so as to enable it to be rearranged to reverse the rotational direction of the control shaft. Although such conventional transmission can be rearranged to locate the operating lever at the right side of the steering column, it has caused an increased cost for the bell-crank arrangement.

SUMMARY OF THE INVENTION

Therefore, it is an object of the present invention to provide a hydraulically controlled transmission for the working vehicle which is provided with a selector valve means capable of adapting to both the left hand operating lever and right hand operating lever.

Another object of the present invention is to provide a power transmission for a working or industrial vehicle having a hydraulic circuit with a selector valve means which is easily adapted to change the rotational direction of a control shaft and allow reversing of the operating lever with respect to the steering column without the necessity for any additional rotation converting means.

A further object of the present invention is to provide a hydraulically operated automatic transmission for the industrial vehicle having a selector valve means in which is included a valve spool releasably and reversibly mounted on a selector shaft rotatable with respect to a valve body so as to switch communication between the inlet port thereof and a forward clutch port or a reverse clutch port.

According to the present invention, there is provided with a transmission for an industrial vehicle a selector valve means having a valve spool therein which is reversible and therefore is adapted for use with both right and left hand drive vehicles to function correctly to shift the control fluid between the fluid source and the forward and reverse clutch chambers. The selector valve means comprises a valve body having two portions releasably connected to one another and a valve spool rotatably disposed therein for providing communication between an inlet port and forward and reverse clutch ports formed in the valve body. The valve spool is mounted on the end of a selector shaft which is rotatably inserted into the valve body and has one end thereof secured to a selector lever cooperating with an operating lever provided adjacent a steering wheel. The selector valve means is further provided with a holding means for holding the selector lever together with the valve spool and shaft assembly in a desired clutch position.

Thus constructed, the selector valve permits locating the operating lever on either side of the steering column without requiring any additional elements or change in construction thereof.

Other objects and advantages sought in the application will be described hereinafter in the description of the preferred embodiment of the present invention.

BRIEF DESCRIPTION OF THE DRAWINGS

The present invention will become more fully understood from the detailed description given below, and the accompanying description of the preferred embodiment of the present invention, which, however, are not to be taken as limiting the present invention in any way, but for the purpose of illustration and explanation only.

In the drawings.

DESCRIPTION OF THE PRIOR ART

Figure 1:
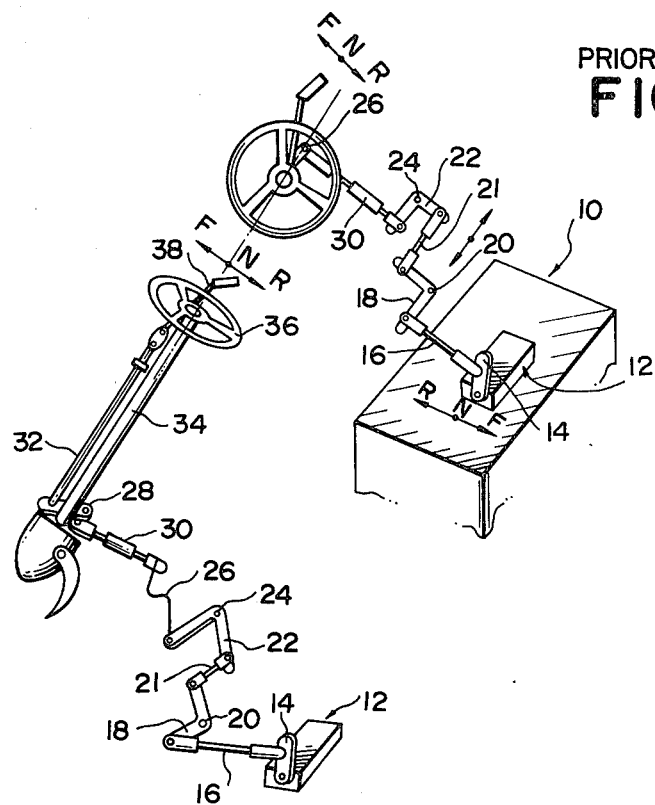
FIG. 1 is a perspective view of the operating portion of the power transmission in which the operating lever is located at the right side of the steering column, according to the prior art.

Before describing the preferred embodiment of the present invention, it will be helpful to explain the conventional operation of the transmission for the working vehicle. FIG. 1 shows a typical construction of the operating lever arrangement for the working vehicle transmission. A hydraulically controlled transmission generally denoted at 10 is provided with a hydraulic control system with a hydraulic circuit. A clutch position selector valve means 12 is disposed within the hydraulic circuit so as to control the application of fluid to either a forward clutch chamber or a reverse clutch chamber and thus to switch the forward and reverse clutch positions. The valve means 12 is provided with a selector lever 14. The selector lever 14 is connected to one end of a controlling rod 16. The other end of the controlling rod 16 is connected to a bell-crank 18 which is pivoted at the pivot 20 and is rotatable about the pivot 20. The bell-crank 18 is connected to another bell-crank 22 at one end thereof by a second controlling rod 21. The bell-crank 22 is also pivoted at a pivot 24 and is rotatable about the pivot 24. The other end of the bell-crank 22 is connected to a control lever 28 through a connecting member 26 such as a coaxial cable. The control lever 28 is connected to a control rod 30 secured on the lower end of a control shaft 32 substantially parallel to a steering column 34 having a steering wheel 36. As also shown in FIG. 1, an operating lever 38 extends to the right from the top of the control shaft 32.

When the operating lever 38 is moved counterclockwise to the forward clutch position F, the control shaft 32 is rotated with the operating lever 38. By counterclockwise rotation of the control shaft 32, the control lever 28 rotates also counterclockwise, thereby causing the bell-crank 22 to rotate about the pivot 24 in clockwise direction. The bell-crank 18 connected to the bell-crank 22 through the connecting rod 21 is thereby rotated about the pivot 20 in a counterclockwise direction to push the selector lever 14 to the right in the drawing, thereby switching the hydraulic circuit into forward clutch position. Alternatively, when the operating lever 38 is moved in the clockwise direction to reverse clutch position R, each element is moved or rotated in the opposite direction relative to that just described in order to switch the application of pressurized fluid to the reverse clutch chamber.

In the FIG. 1 conventional arrangement, the position of the operating lever 38 can be reversed to the left side of the steering column 34. However, this arrangement requires the employment of bell-cranks 18 and 22 together with suitable connecting means therebetween and also means connecting the bell-cranks to the control rod and the selector lever. This increases the cost for reversing the operating lever position due to the cost of these additional elements. Further, the construction of the operating system for the transmission becomes relatively complicated and easily damaged. These disadvantages or drawbacks in the prior art will be prevented by the present invention which will be described hereinafter by way of example.

DESCRIPTION OF THE PREFERRED EMBODIMENT

Figure 2:
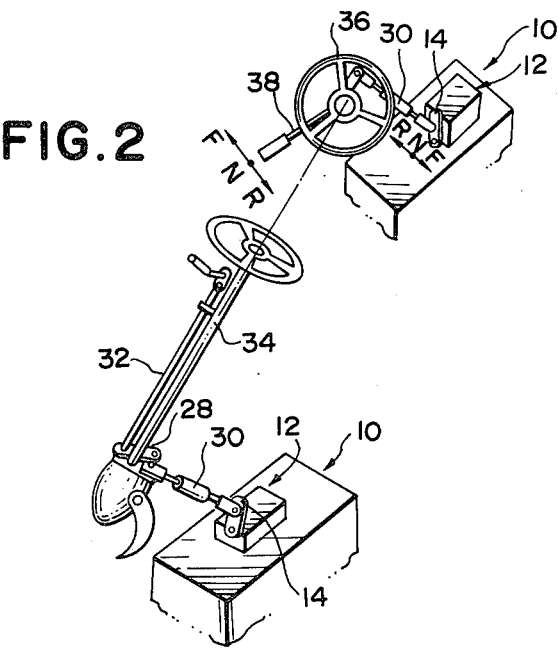
FIG. 2 is a perspective view of the operating portion of the transmission for the industrial vehicle, in which the operating lever is located at left side of the steering column, according to the preferred embodiment of the present invention.

Referring to FIG. 2, there is illustrated a general construction of the operating system of the transmission of a working or industrial vehicle such as a fork lift truck, shovel loader, bulldozer or the like. It should be noted that, for simplification of the hereinafter described explanation and for avoiding confusion of reference numerals, similar elements in FIG. 2 have the same reference numerals as they have in FIG. 1.

An operating lever 38 is secured at the top of a control shaft 32 which is extended substantially parallel to a steering column 34 having a steering wheel 36 at the top thereof. At the lower end of the control shaft 32 is secured a control lever 28 one end of which is connected to a control rod 30. The control rod 30 is directly connected to a selector lever 14. The selector lever 14 is thus operated through the control shaft 32, the control lever 28 and the control rod 30 to control a selector valve means 12 for switching a hydraulic circuit between the forward clutch position and the reverse clutch position. Although the operating lever 38 is located at the left side of the steering column 34 in FIG. 2, it is possible to position the same at the right side of the steering column 34 by adjusting the selector valve means 12 of the present invention.

When the operating lever 38 is moved clockwise to the forward clutch position F, the control shaft 32 is rotated clockwise together with the control lever 28, thereby pushing the selector lever 14 to the right in FIG. 2 to the forward clutch position. On the other hand, when the operating lever 38 is moved counterclockwise to the reverse clutch position R, the control shaft 32 and the control lever 28 are rotated counterclockwise together with the operating lever 38. Thus, the selector lever is moved to the left in FIG. 2 to the reverse clutch position R.

If the operating lever 38 is moved to the right side of the steering column 34, the operating directions of the operating lever are reversed. Therefore, in this case, or driving forward, the operating lever 38 must be moved counterclockwise. However, in accordance with the present invention, such reversal of operating direction of the operating lever is no longer necessary, as the selector valve means 12 of the present invention can adapt to both left side and right side positioning of the operating lever by simple adjustment. Hereinafter will be described more details of the present invention.

Figure 3:
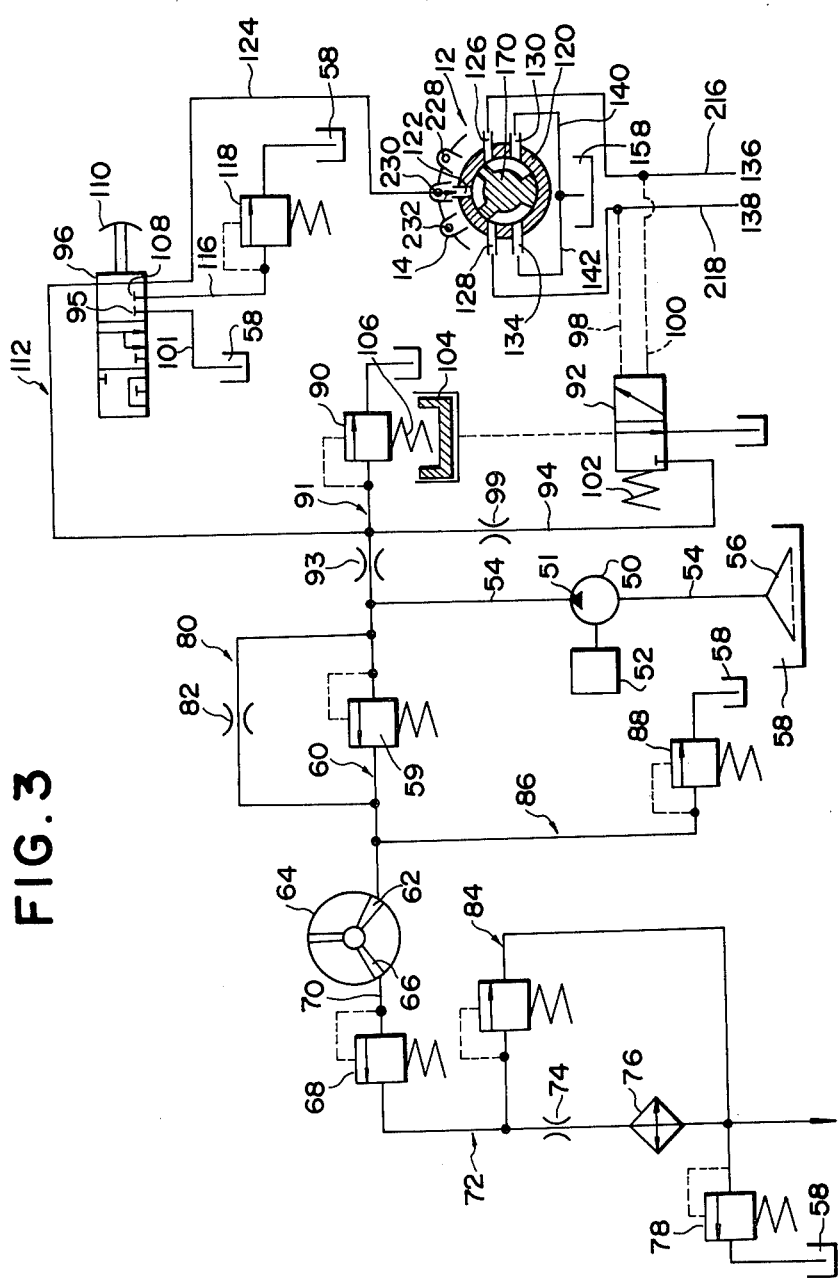
FIG. 3 is a diagrammatical illustration of a hydraulic system of the power transmission for the industrial vehicle having a selector valve means according to the preferred embodiment of the present invention.

Now referring to FIGS. 3 to 10, particularly to FIG. 3, there is illustrated a hydraulic system for a transmission of the working or industrial vehicle including a selector valve means in accordance with the present invention. Such an automatic transmission has been disclosed for example in copending U.S. patent application Ser. No. 052,134, filed by the same inventor as the present application. The automatic transmission generally comprises a torque converter which has a converter housing connected in torque transmission relationship to an engine of the industrial vehicle, an impeller fixedly connected to the housing, a turbine and a stator. The turbine is drivably connected to an output shaft of the converter. The stator is mounted on a stationary sleeve shaft interposing therebetween a one-way roller clutch for preventing the stator from rotating in a direction reverse to the direction in which the output shaft of the engine rotates. The hydraulic torque converter is of a conventional construction which is known to those skilled in the art and functions to drive the output shaft at an increased torque with respect to the torque applied to the input shaft of the converter. The stationary sleeve shaft is formed with a radially extending flanged portion to which is fixedly secured a pump body. The flange portion and the pump body cooperate to receive therewithin a hydraulic pump in the form of a gear pump of a known conventional construction.

The converter output shaft is splined to the input shaft. A clutch drum is arranged coaxially with the clutch input shaft and is secured thereto. The clutch drum is formed with a transverse partition wall which axially divides the hollow interior of the clutch drum into two clutch chambers, i.e. a forward clutch chamber and a reverse clutch chamber. A forward drive ring gear and a reverse drive ring gear are mounted on the clutch input shaft by interposing bushings therebetween and are freely rotatable with respect to the clutch input shaft. The forward and the reverse drive ring gears are respectively meshed with forward and reverse drive gearings through which vehicle drive torque is transmitted via one of the clutches to the vehicle wheels. The ring gears are respectively formed with sleeve extensions which extend into the corresponding forward or reverse clutch chambers of the clutch drum. The clutch drum is formed with internally splined portions to which are splined driving clutch discs. The sleeve extensions have externally splined surfaces to which are splined driven clutch discs. The driving clutch discs and the driven clutch discs are axially alternately arranged to constitute a set of forward drive clutch discs, and, on the other hand, the driving clutch discs are similarly arranged to constitute a set of reverse driven clutch discs. Each of the driving and driven clutch discs has friction facings or friction linings which are made of impregnated paper and which are designed to operate in a hydraulic fluid.

Now returning to FIG. 3, there is diagrammatically illustrated a hydraulic system for operating the foregoing automatic transmission. An oil pump 50 is provided in the housing thereof and is secured on a flange portion of a stationary sleeve shaft (not shown), and is drivingly connected with an engine 52 of the industrial vehicle. The oil pump 50 is interposed in a working fluid passage 54 which is connected, at one end thereof, to a fluid filter 56 inserted into working fluid within a fluid reservoir 58. Thus, the passage 54 acts as a suction passage for the hydraulic operating system of the transmission. The working fluid fed from the outlet port 51 of the oil pump 50 is transmitted to a main pressure valve 59, through a fluid passage 60, connected to an inlet port 62 of the torque converter 64. The outlet port 66 of the torque converter 64 communicates with a pressure relief valve 68 through a fluid passage 70 so as to relieve fluid pressure when the pressure applied to the main valve 59 exceeds a predetermined value. The pressure relief valve 68 also communicates with the fluid reservoir 58 through a passage 72. The passage 72 is provided with an orifice 74, a cooler 76 and a lubricant maintaining valve 78. The fluid passage 60 is provided with a bypass passage 80 with an orifice 82 for bypassing the main pressure valve 59. Further, a bypass passage 84 is also interposed on the fluid passage 72 for bypassing the cooler 76. Between the bypass passage 80 and the inlet port 62 of the torque converter 64 there is provided a return passage 86 communicating with the fluid reservoir 58 through a relief valve 88. The relief valve 88 also acts to relieve the fluid pressure to be applied to the torque converter so as to prevent the torque converter from being subjected to excessive fluid pressure.

The pressurized fluid fed from the outlet port 51 of the oil pump 50 is also supplied to a modulation valve 90 through a fluid passage 91 having an orifice 93. The orifice 93 serves to regulate the fluid flowing therethrough. The modulation valve 90 adjusts fluid pressure to be applied to an inching valve 96 operably connected to a braking pedal 110. The modulation valve 90 is also operably connected to a fluid pressure sensing valve 92 which applies the adjusted pressurized fluid to the modulation valve 90 through a fluid passage 94 having an orifice 99. The pressure sensing valve 92 is hydraulically connected to the selector valve 12 through fluid passages 98 and 100. When the pressurized fluid is applied to the clutch to put the clutch into forward or reverse position, the pressurized fluid is also applied to the pressure sensing valve 92 through either passage 98 or 100. By the fluid pressure applied through the selector valve 12, the valve element of the sensing valve 92 is moved to the left in FIG. 3 against the force of a spring 102 which normally urges the valve element to the right. Therefore, the pressurized fluid is applied to a piston 104 of the modulation valve 90 so that it moves up against the force of a spring 106 to increase the relieving pressure on the modulation valve 90. Thus, any shock possibly caused when substantially high fluid pressure is applied to engage the clutch discs, is absorbed.

One of the outlet ports 108 of the inching valve 96 communicates with the fluid reservoir 58 through passage 116 and relief valve 118, and the other outlet port 95 also communicates with the fluid reservoir 58 through a drain passage 101. Through the inching valve 96, the working fluid is supplied to the selector valve means 12. The inching valve 96 serves as a means for engaging and disengaging the driving and driven discs even when the clutch is in the forward gear position or reverse gear position. The inching valve 96 cooperates with the braking pedal 110 so as to be actuated with the application of the braking pedal 110. When the braking pedal 110 is applied to braking position, the passage 112 communicates with the port 108 of the inching valve 96 which connects the passage 112 to a passage 116 so as to establish communication therebetween. The passage 116 is provided with a relief valve 118. When the passage 112 communicates with the relief valve 118 through the inching valve 96, fluid pressure applied to the clutch discs drops in conformance with the preset pressure of the relief valve 118. Thus, the driving clutch disc and the driven clutch disc are loosely engaged by the decreased fluid pressure so that the vehicle can be driven at a substantially slow speed. Further application of the braking pedal causes the inching valve 96 to establish communication with the drain passage 101 so as to interrupt the supply of pressurized fluid to the clutch and drain the fluid in the clutch to the fluid reservoir 58, thereby, stopping the vehicle.

The selector valve 12 comprises a valve body 120 and a selector valve spool 170. The valve body 120 is provided with an inlet port 122 communicating with the inching valve 96 through a fluid passage 124. The valve body 120 is further provided with a forward clutch port 126, reverse clutch port 128 and drain ports 130 and 134. The forward clutch port 126 communicates with a forward clutch chamber 136 so that it may apply pressurized fluid to the forward clutch chamber 136. Likewise, the reverse clutch port 128 communicates with a reverse clutch chamber 138 so that it may apply the pressurized fluid to the reverse clutch chamber 138. The drain ports 130 and 134 are respectively located substantially parallel to the forward port 126 and the reverse port 128. The drain ports 130 and 134 respectively communicate with the fluid reservoir 58 through drain passages 140 and 142.

Figure 4:
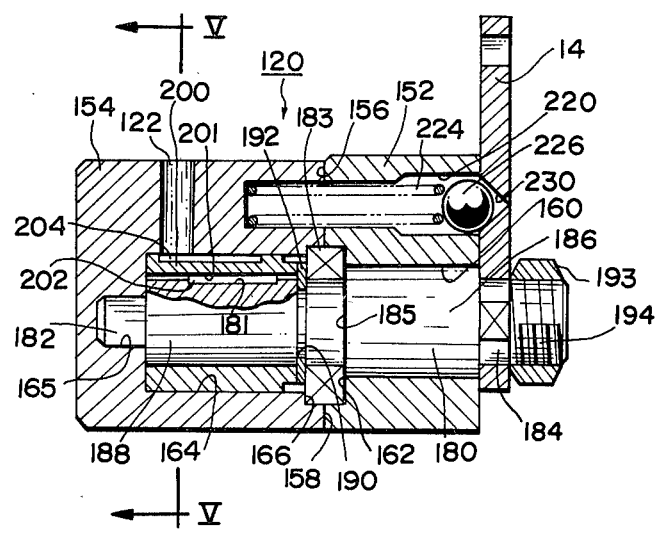
FIG. 4 is an enlarged sectional view of the selector valve means of FIG. 3.
Figure 5:
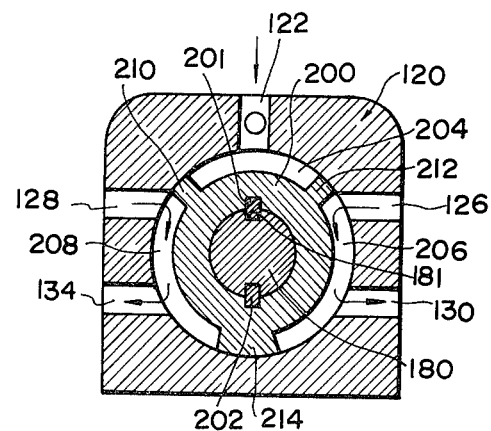
FIGS. 5 to 7 are further enlarged cross-sectional views of the the selector valve means taken along line V—V of FIG. 4.

As shown in FIGS. 4 and 5, the valve body 120 comprises two portions 152 and 154 removably connected to one another at mating ends 156 and 158. The portion 152 of the valve body 120 is formed with an opening 160 extending axially therethrough. The end 156 of the portion 152 is provided with a stepped annular recess 162 on the internal surface thereof extending from the opening 160. The portion 154 of the valve body 120 is formed with a bore 164 extending axially therein. The mating end 158 of the portion 154 is provided with a stepped annular recess 166 extending from the bore 164. The axis of the opening 160 and the bore 164 are aligned. The annular recesses 162 and 166 are substantially the same diameter and are opposed to define an annular groove to receive a bearing 183 therein.

The selector shaft 180 is provided with a cylindrical projection 182 at one end thereof. The cylindrical projection 182 is received by a recess 165 within the valve body 120 concentric with the axial bore 164 so that it may act as a means for centering the selector shaft 180 with respect to the bore. The selector shaft 180 is inserted into the bore 164 of the portion 154 through the opening 160 of the portion 152 so that end thereof is rotatably received within the bore. The selector shaft 180 is stepped at a portion 185 to define two portions 186 and 188 thereon. The portion 186 of the selector shaft 180 is formed with an annular groove 190 for engaging a snap ring 192. The valve spool 200 is provided with longitudinally extending grooves 201 on the internal surface thereof aligned with longitudinal slots 181 formed in the mating outer surface of the selector shaft 180. The grooves 201 and slots 181 together receive keys 202 to secure the valve spool 200 on the portion 186 of the selector shaft 180 so that the valve spool is rotatable with the selector shaft 180. Between the internal surface of the valve body 120 and the external surface of the selector shaft 180 is interposed the bearing 183 so that the selector shaft can be rotated within the valve body. At the outer end of the selector shaft 180 is formed oval portion 184 on the periphery thereof. On the outer end of the selector shaft 180 is fixedly secured the selector lever 14 which is formed with an oval opening corresponding to the oval portion 184 of the selector shaft. The selector lever 14 is restricted from becoming loose on the selector shaft 180 by tightening the nut 193 about the threaded portion 194 formed on the outer end thereof.

The assembled valve body 120 is further provided with a stepped blind bore 220 extending substantially parallel to the axis of the bore 164. Within the bore 220 is disposed a helical compression spring 224, urging a ball 226 outwardly. A plurality of cone-shaped recesses 228, 230 and 232 are formed on the inside surface of the selector lever 14 and are aligned with the open end of the bore 220. The recesses 228, 230 and 232 and the spring-and-ball assembly comprise a means for holding the valve in forward, neutral and reverse clutch positions. When the selector valve means is put in forward clutch position, the recess 228 faces the open end of the bore 220 and the ball member 226 is urged into the recess by the spring 224 to hold the selector lever 14 in the forward clutch position.

As shown in FIGS. 5-10, the valve spool 200 is formed with grooves 204, 206 and 208 defined by projecting ridges 210, 212 and 214 located on radial centerlines spaced 120° apart. The ridge 214 is larger than the other two. As shown in FIG. 5, in the neutral position, the groove 204 communicates with the inlet port 122 and ridges 210 and 212 block the fluid pressure to the forward and reverse clutch ports 126 and 128, respectively. In this position, the groove 206 establishes communication between the forward clutch port 126 and the drain port 130 and the groove 208 establishes communication between the reverse clutch port 128 and the drain port 134.

The selector valve means 12 of the present invention is assembled as follows: The bearing 183 is positioned about the selector shaft 180 and is held in position by the snap ring 192 within the annular snap ring groove 190. Next, the keys 202 are pressfitted into respective key slots 181 of the selector shaft 180, followed by sliding the valve spool 200 thereonto. This shaft-spool-bearing assembly is then inserted into the valve body portion 154, bearing careful to align the selector shaft end projection 182 with the valve body recess 165. Next, the removable valve body portion 152 is positioned about the selector shaft 180 and removably attached to the other valve body portion 154 by any suitable means. The compression spring 224 and ball 226 are then inserted into the bore 220. Finally, the selector lever 14 is positioned on the selector shaft 180 and held in place by the nut 193.

When it is desired to use the selector valve means 12 of the present invention with a vehicle having an opposite-hand steering and shifting mechanism, the above sequence of steps for assemblying the selector valve 12 is reversed to disassemble same to the step of removing the valve spool 200 from the selector shaft 180. At this point, the valve spool 200 is simply partially removed from the selector shaft 180, rotated 180° about its longitudinal axis and replaced thereon, followed by reassembling the selector valve means 12 as outlined hereinabove.

Figure 6:
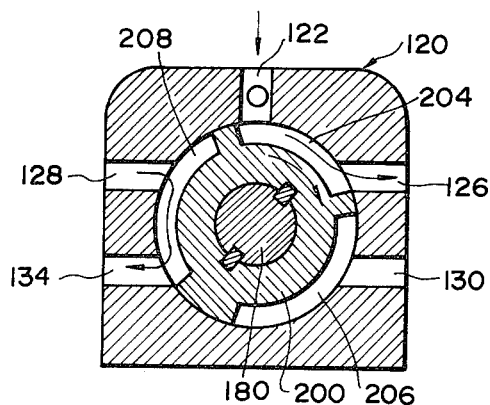
Figure 7:
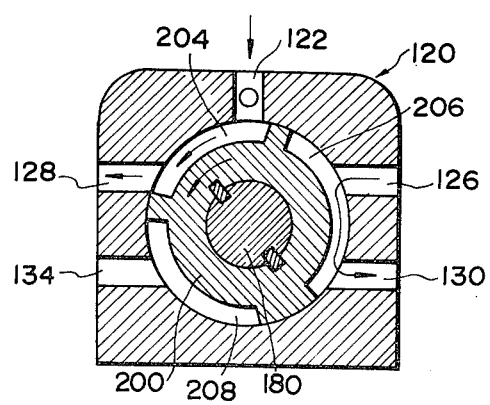

When the operating lever 38 of FIG. 2 is positioned in the forward drive position, the selector lever 14 is rotated clockwise in the drawings to rotate the selector shaft 180 together with the valve spool 200 in a clockwise direction, as shown in FIG. 6. In this position, the groove 204 establishes communication between the inlet port 122 and the forward clutch port 126, thereby, applying fluid pressure to the forward clutch chamber 136 through a passage 216 (See FIG. 3). Similarly, when the operating lever 38 is moved to the reverse clutch position, the selector lever 14 is rotated counter-clockwise in the drawings. Thus the selector shaft 180 is rotated counter-clockwise together with the valve spool 200, as shown in FIG. 7, thereby, causing the groove 204 to establish communication between the inlet port 122 and the reverse clutch port 128. In this position, the forward clutch port 126 communicates with the drain port 130. Through the inlet port 122, the reverse clutch port 128 and a fluid passage 218 (See FIG. 3) fluid pressure is applied to the reverse clutch chamber 138. By the application of fluid pressure both to the reverse driving clutch disc and the driven clutch disc, engagement between the driving disc and the driven disc is established.

Figure 8:
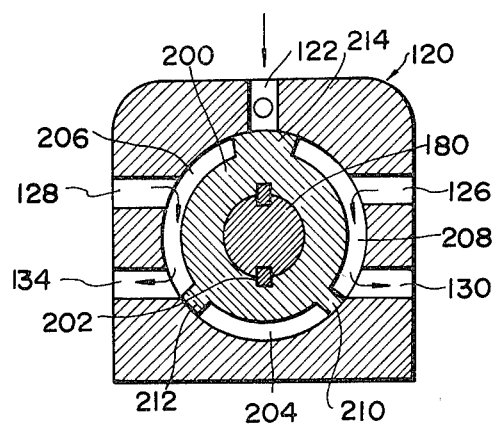
FIGS. 8 to 10 are views similar to FIGS. 5 to 7, but showing the valve spool mounted on the selector shaft in reversed position.
Figure 9:
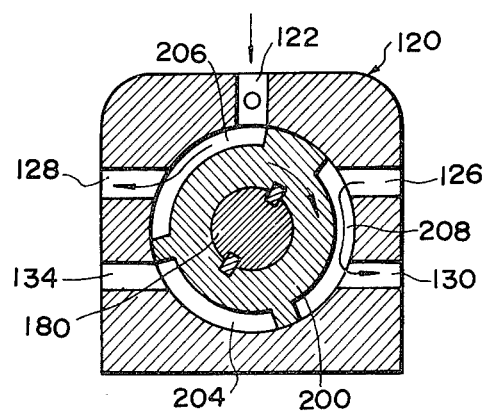
Figure 10:
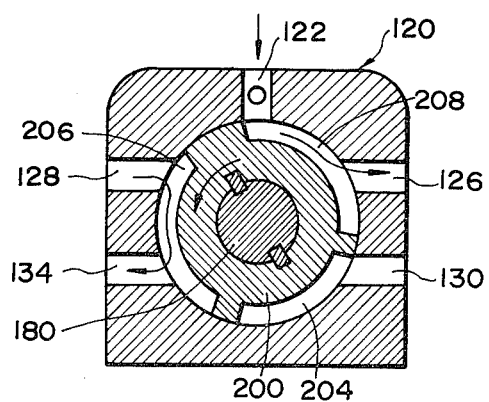

When locating the operating lever 38 on the opposite side of the steering column, the fastening means holding the portions 152 and 154 is released to allow separating the portions from one another. Next, the selector shaft 180 and the valve spool 200 are removed from the bore 164, the valve spool rotated, and the selector valve means 12 reassembled as outlined hereinabove. So assembled as shown in FIG. 8, the valve spool 200 is mounted on the selector shaft 180 in reversed position. Then, in the neutral position, the ridge 214 closes the inlet port 122 so as not to allow the pressurized fluid to flow into the valve body 120. In this position, the groove 206 establishes communication between the reverse clutch port 128 and the drain port 134 and the groove 208 establishes communication between the forward clutch port 126 and the drain port 130. When the operating lever 38 is turned to the reverse clutch position in which the operating lever 38 will be moved in the opposite direction of the normal arrangement of the same, the selector lever 14 rotates clockwise in FIG. 9 together with the selector shaft 180 and the valve spool 200. In this position, the groove 206 establishes communication between the inlet port 122 and the reverse clutch port 128, and the forward clutch port 126 communicates with the drain port 134 through the groove 208. Alternatively, when the operating lever 38 is turned to the forward clutch position, the selector lever 14, the selector shaft 180 and the valve spool 200 all together rotate counter-clockwise (FIG. 10) to establish communication between the forward clutch port 126 and the inlet port 122 through the groove 208. Then, the groove 206 connects the reverse clutch port 128 to the drain port 134.

According to the present invention as described hereinbefore, it is possible to reverse the position of the operating lever of the transmission without the necessity for additional elements. Therefore, according to the present invention, bell-cranks are no longer necessary in order to adapt the selector valve means when reversing the operating lever with respect to the steering column. Furthermore, the selector valve means has a very simple construction, and it is easy to reverse the valve spool by in order to reverse alternating same for adapting the operating lever.

Thus, the present invention has fulfilled all of the objects and advantages sought thereby. While the present invention has been shown and described with respect to a preferred embodiment, it should not, however, be considered as limited to that embodiment or any other embodiment. Further, variations could be made to the form and the details of any parts or elements, without departing from the principle of the invention which is defined solely by the claims hereof.

What is claimed is:

1. A selector valve for controlling fluid flow between a fluid pressure source and first and second operating ports, said selector valve comprising:
   (A) a valve body having:
      (a) a bore therein,
      (b) an inlet port,
      (c) a first operating port,
      (d) a second operating port, and
      (e) a drain port, each of said ports communicating with said bore; and
   (B) a valve element removably positioned within said bore in a first orientation in which:
      (a) said inlet port is blocked from fluid flow through said valve, said first operating port and said second operating port communicating with said drain port,
      (b) said valve element being shiftable clockwise establishing communication between said inlet port and said first operating port while blocking communication between said first operating port and said drain port, and
      (c) said valve element being shiftable counter-clockwise establishing communication between said inlet port and said second operating port while blocking communication between said second operating port and said drain port;
   and in a second orientation in which:
      (a) said inlet port is blocked from fluid flow through said valve, said first operating port and said second operating port communicating with said drain port,
      (b) said valve element being shiftable clockwise establishing communication between said inlet port and said second operating port while blocking communication between said second operating port and said drain port, and
      (c) said valve element being shiftable counter-clockwise establishing communication between said inlet port and said first operating port while blocking communication between said first operating port and said drain port.

2. A clutch position selector valve operably connected to a transmission shift lever, comprising:
   (A) a selector valve body having:
      (a) an inlet port,
      (b) a first operating port,
      (c) a second operating port,
      (d) a drain port; and
   (B) a valve element removably positioned for rotational movement within said valve body and positioned therein in a first orientation in which:
      (a) said inlet port is blocked from fluid flow through said valve, said first operating port and said second operating port communicating with said drain port,
      (b) said valve element being rotatable clockwise establishing communication between said inlet port and said first operating port while blocking communication between said first operating port and said drain port, and
      (c) said valve element being rotatable counter-clockwise establishing communication between said inlet port and said second operating port while blocking communication between said second operating port and said drain port;
   and in a second orientation in which:
      (a) said inlet port is blocked from fluid flow through said valve, said first operating port and said second operating port communicating with said drain port,
      (b) said valve element being rotatable clockwise establishing communication between said inlet port and said second operating port while blocking communication between said second operating port and said drain port, and
      (c) said valve element being rotatable counter-clockwise establishing communication between said inlet port and said first operating port while blocking communication between said first operating port and said drain port.

3. A clutch position selector valve operably connected to a transmission shift lever, comprising:
   (A) a selector valve body having:
      (a) a bore therein,
      (b) an inlet port,
      (c) a first operating port,
      (d) a second operating port,
      (e) a first drain port, and
      (f) a second drain port, each of said ports communicating with said bore; and (B) a valve element removably positioned for rotational movement within said bore in a first orientation in which:
- (a) said inlet port is blocked from fluid flow through said valve, said first operating port communicating with said first drain port, and said second operating port communicating with said second drain port,
- (b) said valve element being rotatable clockwise establishing communication between said inlet port and said first operating port while blocking communication between said first operating port and said first drain port, and
- (c) said valve element being rotatable counterclockwise establishing communication between said inlet port and said second operating port while blocking communication between said second operating port and said second drain port;

and in a second orientation in which:
- (a) said inlet port is blocked from fluid flow through said valve, said first operating port communicating with said first drain port, and said second operating port communicating with said second drain port,
- (b) said valve element being rotatable clockwise establishing communication between said inlet port and said second operating port while blocking communication between said second operating port and said second drain port, and
- (c) said valve element being rotatable counterclockwise establishing communication between said inlet port and said first operating port while blocking communication between said first operating port and said first drain port.

4. A selector valve for use in an automatic power transmission including:
- (a) an operating pressure feed line,
- (b) a forward hydraulically actuated clutch,
- (c) a reverse hydraulically actuated clutch,
- (d) power input means,
- (e) power output means, and
- (f) an operating fluid reservoir, said selector valve comprising:
- (a) a selector valve body having:
  - (i) an inlet port communicating with said operating pressure feed line,
  - (ii) a forward operating port communicating with said forward clutch,
  - (iii) a reverse operating port communicating with said reverse clutch, and
  - (iv) a drain port communicating with said fluid reservoir, and
- (b) a valve element removably positioned for rotational movement within said valve body and positionable therein in a first orientation in which:
  - (i) said valve element blocks communication between said operating pressure feed line and each of said clutches, and each of said clutches communicates with said fluid reservoir,
  - (ii) said valve element being rotatable clockwise establishing communication between said operating pressure feed line and said forward clutch and blocks communication between said forward clutch and said drain port, and
  - (iii) said valve element being rotatable counterclockwise establishing communication between said operating pressure feed line and said reverse clutch and blocks communication between said reverse clutch and said drain port, and in a second orientation in which:
- (i) said valve element blocks communication between said operating pressure feed line and each of said clutches, and each of said clutches communicates with said fluid reservoir,
- (ii) said valve element being rotatable clockwise establishing communication between said operating pressure feed line and said reverse clutch and blocks communication between said reverse clutch and said drain port, and
- (iii) said valve element being rotatable counterclockwise establishing communication between said operating pressure feed line and said forward clutch and blocks communication between said reverse clutch and said drain port.

5. The valve as set forth in claims 1, 2, 3 or 4, wherein said valve element comprises a cylindrical spool having three fluid sealing ridges formed thereon and projecting radially therefrom for sealing against the interior surface of said valve body to selectively control fluid flow therethrough.

6. The valve as set forth in claim 5, wherein said valve element fluid sealing ridges are oriented axially on said cylindrical spool and are positioned 120° apart about the axis of said spool.

7. The valve as set forth in claim 5, wherein said cylindrical spool is slidably positioned about a valve shaft wherein said valve spool first and second orientations are 180° apart about the axis of said valve spool.

8. An automatic power transmission for an industrial vehicle having a hydrokinetic torque converter, a transmission housing, an operating pressure feed line, a pressure modulating valve to regulate the fluid pressure in said operating pressure feed line, said presure modulating valve including a drain port, a lubricating oil feed port and a hydraulic pressure responsive valve element that is displaceable to uncover said lubricating oil feed port before it uncovers said drain port upon modulating operation thereof, feed passage means for feeding a hydraulic fluid under pressure from said operating presssure feed line to said torque converter, exhaust passage means for exhausting the fluid from said torque converter, clutch position selector valve means operably connected to an operating lever mounted adjacent to a steering wheel, said selector valve means causing the clutch to move between a forward clutch position and a reverse clutch position, said selector valve means comprising:
a selector valve body having a substantially cylindrical configuration and having a bore therein, said valve body being provided with an inlet port communicating with said hydraulic fluid feed passage means, a forward clutch port communicating wth a forward clutch chamber of a clutch drum, a reverse clutch port communicating with a reverse clutch chamber of said clutch drum, and drain ports arranged substantially parallel to respective corresponding said forward and reverse clutch ports;
a selector shaft rotatably received within said bore, said selector shaft having one end protruding outwardly from said bore;
a selector lever fixedly secured on said outwardly protruding end of said selector shaft and operably connected to an operating means for switching the position of said clutch between said forward clutch position and said reverse clutch position; and a valve spool releasably secured on the other end of said selector shaft so as to rotate therewith, said valve spool being provided with three grooves through one of which said inlet port of said valve body communicates with said forward clutch port and said reverse clutch port selectively and when one of said grooves of said valve spool establishes communication between said inlet port and either said forward clutch port or said reverse clutch port, the other grooves do not communicate with said inlet port, and said valve spool being reversible on said selector shaft so as to allow positioning of an operating lever of said operating means on the opposite side with respect to a steering column of the vehicle by reversing the position thereof.

9. An automatic power transmission, as recited in claim 8, wherein said valve spool is formed with three peripheral longitudinally extending ridges defining three longitudinally extending grooves therebetween.

10. The automatic power transmission as recited in claim 9, wherein said ridges are oriented about radial centerlines 120° apart.

11. An automatic power transmission, as recited in claim 8, wherein said valve spool has a substantially cylindrical form and is slidably positioned about and fixed to a selector shaft so as to rotate therewith.

12. An automatic power transmission, as recited in claim 8, 9, 10 or 11, further comprising means for retaining said selector lever in each of said forward, reverse and neutral postions.

13. An automatic power transmission, as recited in claim 12, wherein said selector lever retaining means comprises:
a second bore formed in said valve body and extending substantially parallel to said valve body bore;
a member movably disposed within said second bore and having a round portion at the outer end thereof;
a spring member disposed within said second bore and urging said movable member outwardly; and
a plurality of recessed formed on the inner surface of said selector lever, each of said recesses selectively receiving said movable member so as to retain said selector lever in forward, reverse or neutral position.

14. A selector valve for selectively connecting a fluid source to first and second working sections, said selector valve comprising:
a valve body having an axially extending bore, and first, second and third ports, said first port establishing communication between said fluid source and said bore, said second port establishing communication between said bore and said first working section, and said third port establishing communication between said bore and said second working section;
a valve element disposed within said bore and being rotatable about its longitudinal axis, the rotational axis of said valve element being co-axial with the longitudinal axis of said bore, said valve element rotating in one direction to establish communication between said first port and said second port, said valve element rotating in the other direction to establish communication between said first port and said third port, said valve element being shaped and sized to permit it to be removed from and reversely positioned within said bore, said reversely positioned valve element rotating in said one direction to establish communication between said first port and said third port, said reversely positioned valve element rotating in said other direction to establish communication between said first port and said second port.

15. An automatic power transmission for an industrial vehicle having a hydrokinetic torque converter, a transmission housing, an operating pressure feed line, a pressure modulating valve to regular the fluid pressure in said operating pressure feed line, said pressure modulating valve including a drain port, a lubricating oil feed port and a hydraulic pressure responsive valve element that is displaceable to uncover said lubricating oil feed port before it uncovers said drain port upon modulating operation thereof, feed passage means for feeding a hydraulic fluid under pressure from said operating pressure feed line to said torque converter, exhaust passage means for exhausting the fluid from said torque converter, clutch position selector valve means operably connected to an operating lever mounted adjacent a steering wheel, said selector valve means causing the clutch to move between a forward clutch position and a reverse clutch position, said selector valve means comprising:
a selector valve body having a substantially cylindrical configuration and having a bore therein, said valve body being rovided with an inlet port communicating with said hydraulic fluid feed passage means, a forward clutch port communicating with a forward clutch chamber of a clutch drum, a reverse clutch port communicating with a reverse clutch chamber of said clutch drum, and drain ports arranged substantially parallel to respective corresponding said forward and reverse clutch ports;
a valve spool coaxially disposed within said bore of said valve housing and rotatable about its axis between first and second and third positions, said valve spool blocking communication between said inlet port and said forward and reverse clutch ports in said first position, said valve spool establishing communication between said inlet port and said forward clutch port and between said reverse clutch port and said drain port in said second position, and said valve spool establishing communication between said inlet port and said reverse clutch port and between said forward clutch port and said drain port in said third position, said valve spool being shaped and sized to permit it to be removed from and reversely positioned within said bore, said rotating valve spool thereupon establishing the previously described third position communication relationship in said second position, and establishing the previously described second position communication relationship in said third position; and
a selector lever for rotating said valve spool to said first, second and third positions, said selector lever including means for releasably affixing said selector lever to said valve spool at both axial ends of said valve spool.

* * * * *